(12) United States Patent
Park et al.

(10) Patent No.: US 10,056,597 B2
(45) Date of Patent: Aug. 21, 2018

(54) CONNECTING STRUCTURE AND METHOD BETWEEN GRID AND ELECTRODE TAB OF SECONDARY BATTERY

(71) Applicant: Kokam Co., Ltd., Gyeonggi-do (KR)

(72) Inventors: Pan-Kyu Park, Gwangju (KR); Ki-Hong Park, Daejeon (KR); Ji-Jun Hong, Gyeonggi-do (KR); Choong-Yeon Chong, Ulsan (KR)

(73) Assignee: Kokam Co., Ltd., Gyeonggi-Do (KR)

( * ) Notice: Subject to any disclaimer, the term of this patent is extended or adjusted under 35 U.S.C. 154(b) by 293 days.

(21) Appl. No.: 14/982,175

(22) Filed: Dec. 29, 2015

(65) Prior Publication Data

US 2016/0260952 A1    Sep. 8, 2016

(30) Foreign Application Priority Data

Mar. 4, 2015    (KR) .................. 10-2015-0030639

(51) Int. Cl.
*H01M 4/02* (2006.01)
*H01M 2/26* (2006.01)
*H01M 2/30* (2006.01)

(52) U.S. Cl.
CPC .............. *H01M 2/26* (2013.01); *H01M 2/30* (2013.01)

(58) Field of Classification Search
CPC ............ H01M 2/26; H01M 2/30; H01M 2/22; H01M 2/263
See application file for complete search history.

(56) References Cited

U.S. PATENT DOCUMENTS

2007/0099074 A1    5/2007    Yoon et al. .................... 429/158

FOREIGN PATENT DOCUMENTS

| JP | 2001-283824 | 10/2001 | .............. H01M 2/26 |
| JP | 2007-305477 | 11/2007 | ............. H01M 10/40 |
| JP | 2010-232573 | * 10/2010 | .............. H01G 9/155 |
| JP | 2012-043714 | 3/2012 | .............. H01M 2/20 |
| KR | 10-2007-0049553 | 5/2007 | .............. H01M 2/10 |
| KR | 10-0908569 | 7/2009 | .............. H01M 2/20 |
| KR | 10-2013-0142656 | 12/2013 | .............. B23K 31/02 |

* cited by examiner

*Primary Examiner* — Raymond Alejandro
(74) *Attorney, Agent, or Firm* — Harness, Dickey & Pierce, P.L.C.

(57) ABSTRACT

Disclosed is a connecting structure and method between a grid and an electrode tab of a secondary battery, which may ensure stable connection between the grid and the electrode tab of an electrode assembly and allow improved productivity. The connecting structure includes a grid integrally extending from an electrode plate of a secondary battery, an electrode tab connected to the grid, and a laser welding portion connecting the grid and the electrode tab. Also, a connecting method between a grid and an electrode tab of a secondary battery includes (a) fixing the grid with a jig, (b) cutting the grid, and (c) stacking the grid and the electrode tab and connecting the grid and the electrode tab by means of laser welding.

1 Claim, 5 Drawing Sheets

CONNECTING STRUCTURE AND METHOD BETWEEN GRID AND ELECTRODE TAB OF SECONDARY BATTERY

CROSS-REFERENCE TO RELATED APPLICATION

The present application claims the benefit of Korean Patent Application No. 10-2015-0030639 filed on Mar. 4, 2015 with the Korean Intellectual Property Office, the disclosure of which is incorporated herein by reference in its entirety.

FIELD

The present disclosure relates to a connecting structure and method between a grid and an electrode tab of a secondary battery, and more particularly, to a connecting structure and method between a grid and an electrode tab of a secondary battery, which improves a yield and productivity through a simplified process, improves connection between the grid integrated with an electrode plate and the electrode tab serving as an external terminal, minimizes resistance and is suitable for large-capacity high output.

BACKGROUND

This section provides background information related to the present disclosure which is not necessarily prior art.

With the technical developments and extensive use of mobile devices, electric vehicles, hybrid vehicles, power storages, uninterruptible power supplies or the like, the demands on secondary batteries as an energy source rapidly increase, and batteries capable of coping with various demands are being actively studied.

Generally, a secondary battery is a battery capable of charging and discharging. Particularly, a lithium secondary battery has a high operation voltage, and thus it is more widely used not only for existing high-tech electronic devices such as cellular phones, notebooks, camcorders or the like but also various fields requiring high power and large capacity such as uninterruptible power supplies, electric bicycles, electric wheelchairs, electric vehicles or the like.

The lithium secondary battery generally uses a lithium-based oxide as a positive electrode active material and uses a carbon material as a negative electrode active material. Depending on the kind of electrolyte, the lithium secondary battery is classified into a lithium ion battery using a liquid electrolyte and a lithium polymer battery using a polymer electrolyte. Also, depending on the shape of a can accommodating the electrode assembly, the lithium secondary battery is classified into a cylindrical battery, a rectangular battery and a pouch-type battery.

An electrode assembly of an existing pouch-type secondary battery includes a grid extruding from a laminated electrode plate body and an electrode tab connected to the grid to serve as an electrode terminal of the secondary battery. The electrode assembly is configured so that a positive electrode plate, a separator and a negative electrode plate are laminated or wound in order.

In case of existing secondary batteries, the electrode tab is connected to the grid of the electrode assembly by means of ultrasonic welding or riveting. However, in the ultrasonic welding, as the number of laminated electrode plates increases or the thickness of the current collector foil or the electrode tab increases, overheating or vibration is generated during the welding work, which may deform the separator or easily damage the electrode plate. In case of riveting, a plurality of processes is required, which deteriorates productivity.

Meanwhile, the above problems during the secondary battery manufacturing process are commonly found not only for a pouch-type secondary battery but also all kinds of batteries where several grids are connected to an electrode tab.

SUMMARY

This section provides a general summary of the disclosure, and is not a comprehensive disclosure of its full scope or all of its features.

The present disclosure is designed, in part, to solve the problems of the related art, and therefore the present disclosure is directed to providing a connecting structure and method between a grid and an electrode tab of a secondary battery, which may ensure stable connection between the grid and the electrode tab of an electrode assembly and allow improved productivity.

In one aspect of the present disclosure, there is provided a connecting structure between a grid and an electrode tab of a secondary battery, comprising: a grid integrally extending from an electrode plate of a secondary battery; an electrode tab connected to the grid; and a laser welding portion connecting the grid and the electrode tab.

In a particular embodiment, the laser welding portion may be formed with a predetermined pattern.

The predetermined pattern may be any one selected from the group consisting of a linear pattern, a zigzag pattern and a wave pattern. In addition, the predetermined pattern may be formed with a plurality of welding lines.

In a particular embodiment, the connecting structure may further include a protecting member configured to surrounding the connection portion between the welding portion and the grid.

The protecting member may be at least one selected from the group consisting of polyethylene, polypropylene and polyimide.

In a particular embodiment, the electrode tab may have a resin for facilitating sealing of a packing material.

In another aspect of the present disclosure, there is also provided a connecting method between a grid and an electrode tab of a secondary battery, comprising: (a) fixing the grid with a jig; (b) cutting the grid; and (c) stacking the grid and the electrode tab and connecting the grid and the electrode tab by means of laser welding.

In a particular embodiment, the connecting method may further include pre-welding the grid, before the step (a).

In a particular embodiment, the connecting method may further include stacking the electrode tab on the grid and aligning a location of the electrode tab, after the step (b).

In a particular embodiment, in the step (c), the laser welding may form a laser welding portion at a region where the grid and the electrode tab are stacked.

The laser welding portion may be formed to have a predetermined pattern repeatedly.

The predetermined pattern may be any one selected from the group consisting of a linear pattern, a zigzag pattern and a wave pattern.

According to the present disclosure, it is possible to ensure stable connection between the electrode tab and the grid, minimize resistance, and improve a yield and productivity through simplified processes.

BRIEF DESCRIPTION OF THE DRAWINGS

The accompanying drawings illustrate embodiments of the present disclosure and, together with the foregoing disclosure, serve to provide further understanding of the technical features of the present disclosure. However, the present disclosure is not to be construed as being limited to the drawings.

DETAILED DESCRIPTION

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just an example for the purpose of illustrations only, not intended to limit the scope of the disclosure, so it should be understood that other equivalents and modifications could be made thereto without departing from the scope of the disclosure.

Figure 1:
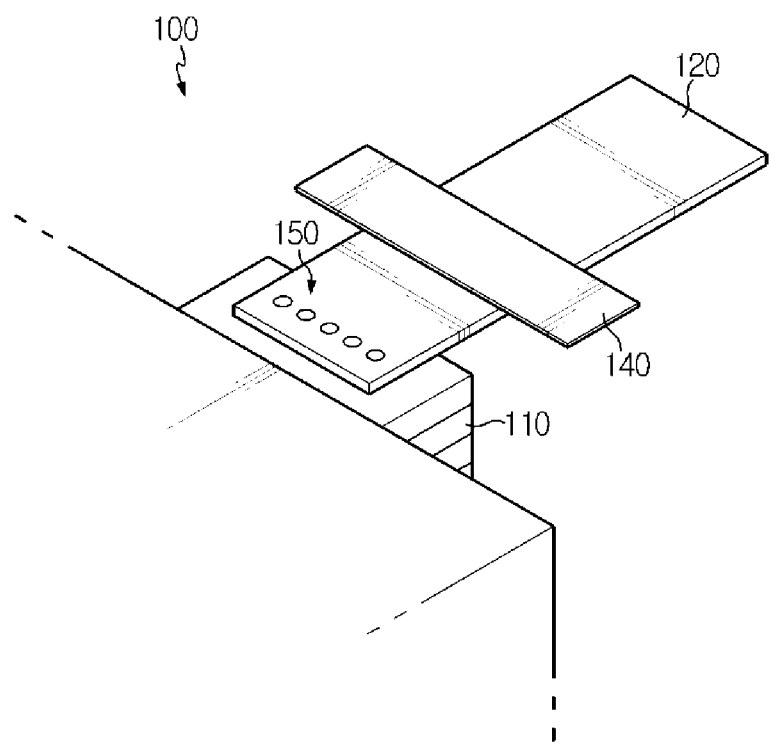
FIG. 1 is an exploded perspective view schematically showing an existing connecting structure between a grid and an electrode tab of a secondary battery.

FIG. 1 is an exploded perspective view schematically showing a connecting structure between a grid and an electrode tab of an existing secondary battery. An existing secondary battery includes an electrode assembly 100 in which a positive electrode plate, a separator and a negative electrode plate are laminated or wound in order, a grid 110 integrally extending from the electrode assembly 100, and an electrode tab 120 connected to the grid 110 by a rivet 150. A resin 140 is attached to the electrode tab 120 to facilitate sealing of a packing material when the electrode assembly 100 is accommodated in the packing material made of a pouch film or the like.

Figure 2A:
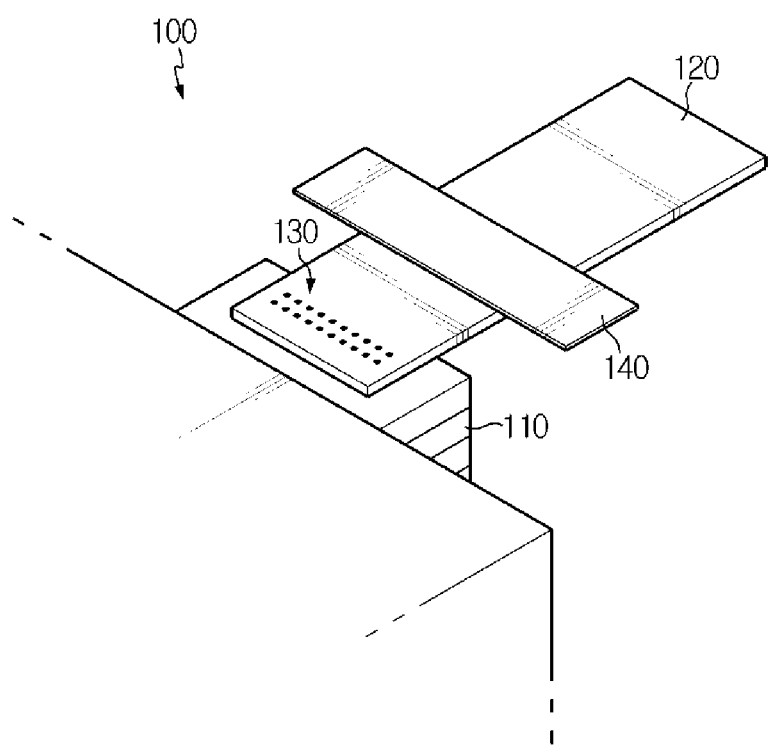
FIGS. 2a and 2b are exploded perspective views schematically showing a connecting structure between a grid and an electrode tab of a secondary battery according to an embodiment of the present disclosure.
Figure 2B:
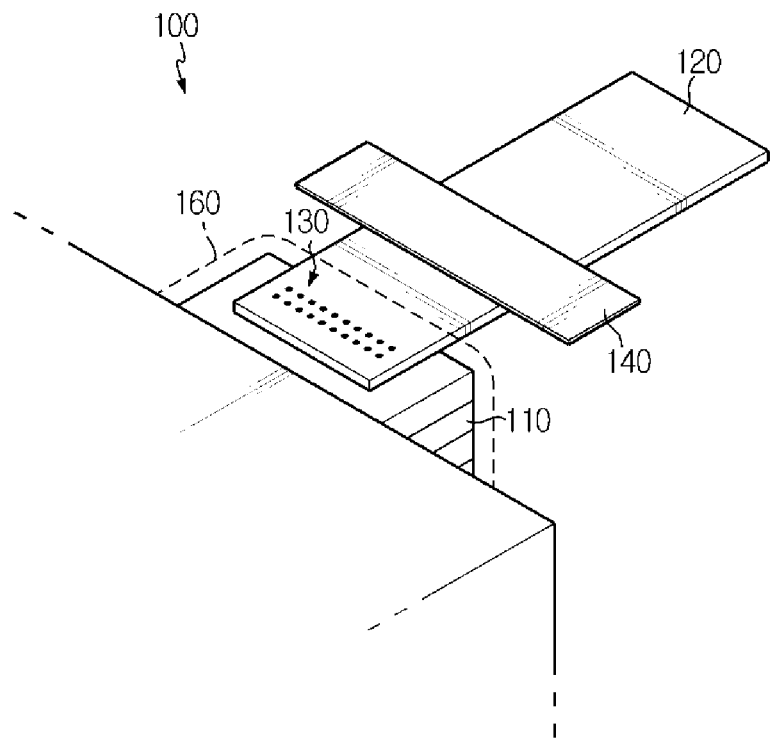

FIGS. 2a and 2b are exploded perspective views schematically showing a connecting structure between a grid and an electrode tab of a secondary battery according to an embodiment of the present disclosure. The secondary battery according to the present disclosure includes an electrode assembly 100 in which a positive electrode plate, a separator and a negative electrode plate are laminated or wound in order, a grid 110 integrally extending from the electrode assembly 100, and an electrode tab 120 connected to the grid 110 by a laser welding portion 130.

Referring to FIG. 2b, the connecting structure may further include a protecting member 160 surrounding the connection portion between the grid 110 and the electrode tab 120. The protecting member may be any one selected from the group consisting of polyethylene, polypropylene and polyimide.

Figure 3A:
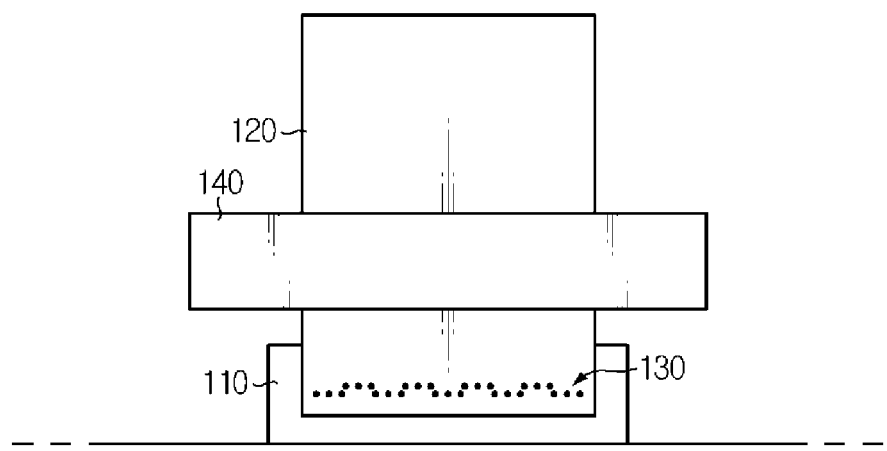
FIGS. 3a and 3b are bottom views showing the connecting structure between the grid and the electrode tab of the secondary battery according to an embodiment of the present disclosure.
Figure 3B:
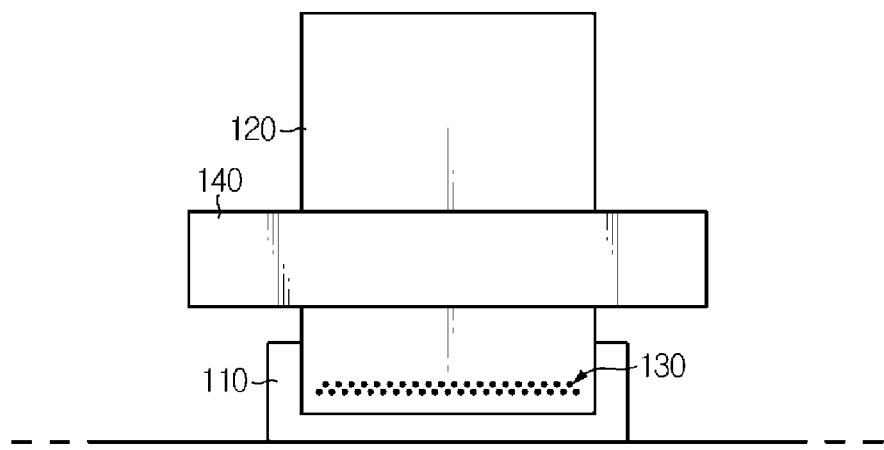

FIGS. 3a and 3b are bottom views showing the connecting structure between the grid and the electrode tab of the secondary battery according to an embodiment of the present disclosure. Referring to FIGS. 3a and 3b, the laser welding portion 130 is formed with a predetermined pattern, which may be any one selected from the group consisting of a linear pattern, a zigzag pattern and a wave pattern. The predetermined pattern may be formed with a plurality of welding lines.

The electrode assembly 100 includes a positive electrode plate, a negative electrode plate, and a separator interposed between the positive electrode plate and the negative electrode plate to electrically isolate the positive electrode plate and the negative electrode plate from each other. The electrode assembly may be a unit cell or a bi-cell, or a laminate of unit cells or bi-cells.

The grid 110 may be any one of a positive electrode grid and a negative electrode grid. The positive electrode grid and the negative electrode grid may be arranged in opposite directions with respect to the length direction of the electrode assembly. In addition, a plurality of grids 110 may be provided depending on the number of electrode plates. However, the electrode tab 120 is composed of positive and negative electrode tabs respectively connected to the positive and negative electrode grids.

Generally, the electrode assembly 100 is accommodated in a packing material (not shown), filled with an electrolyte (not shown) and then packaged.

In addition, the positive electrode plate is prepared by coating one surface or both surfaces of a metallic (foil) current collector made of aluminum or the like with a positive electrode active material and then drying the same, and the positive electrode grid protrudes at a portion of the current collector where the positive electrode active material is not coated. The negative electrode plate is prepared by coating one surface or both surfaces of a metallic (foil) current collector made of copper or the like with a negative electrode active material and then drying the same, and the negative electrode grid protrudes at a portion of the current collector where the negative electrode active material is not coated. The separator includes a polymer porous film made of polyethylene (PE) or polypropylene (PP) and has a single-layered or multi-layered structure. A positive electrode plate and a negative electrode plate are respectively located at both surfaces of the separator.

In addition, the surface of the separator may be coated with an ion-conductive polymer adhesive (not shown). The ion-conductive polymer adhesive may employ an ion-conductive polymer, for example SBR Latex-based adhesives, acrylic solvent adhesives, adhesives using PAN (homo, co-polymer), adhesives using PAN/PVDF blending, or solvent-type adhesives such as MMA/PMMA polymer adhesives in order to adhere the positive electrode plate and the negative electrode plate to the separator without disturbing conductivity of lithium ions.

An existing connecting method between a grid and an electrode tab of a secondary battery includes the following steps of:

(1) pre-welding a grid;
(2) cutting the grid;
(3) stacking an electrode tab on the grid and aligning a location of the electrode tab;
(4) forming a rivet hole at a region where the grid and the electrode tab are stacked;

(5) supplying a washer to the other end of the rivet;

(6) inserting a corresponding rivet into the rivet hole; and (7) connecting the grid and the electrode tab by roll-pressing the rivet portion. Therefore, the existing connecting method requires several processes, which deteriorates a yield and productivity.

A connecting method between a grid and an electrode tab of a secondary battery according to the present disclosure includes the following steps of:

(a) fixing a grid 110 with a jig 170;

(b) cutting the grid; and (c) stacking the grid and the electrode tab 120 and connecting the grid and the electrode tab by means of laser welding. The connecting method of the present disclosure has simplified processes in comparison with the existing connecting method and thus may improve a yield and productivity.

Figure 4:
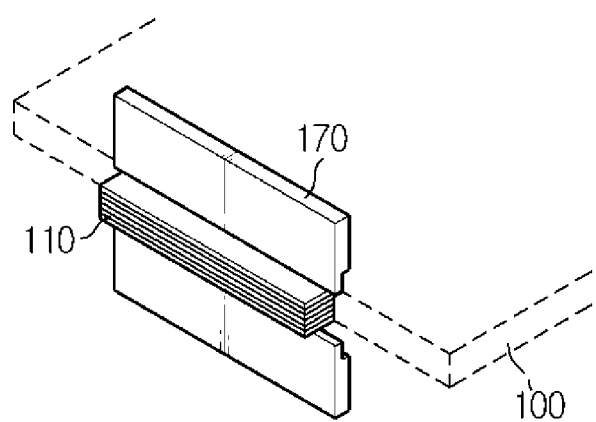
FIG. 4 is a diagram for illustrating a process of fixing a grid with a jig.

In Step (a), the electrode assembly 100 is positioned on a tray, and the tray is fixed using a fixing pin. After that, the grid 110 is fixed using the jig 170, and at this time, a height of the grid may be adjusted using a height adjustment device so that the grid is located at the center of the thickness of the electrode assembly 100. FIG. 4 is a diagram for illustrating a process of fixing the grid 110 with the jig 170. The jig 170 depicted in FIG. 4 is just an example, and the present disclosure is not limited thereto. The jig 170 may have a shape processed not to damage the electrode assembly 100 but just to allow the grid 100 to be gripped.

In Step (b), in a state where the grid 110 is fixed with the jig 170, a cutting device advances toward the electrode assembly 100. The cutting device may include a stripper for holding the grid 110 not to move, a knife for cutting the grid, and a cylinder for operating the knife. The knife may be composed of an upper knife and a lower knife. In the cutting process, after the grid 110 is located on the lower knife, in a state where the stripper holds the grid 110 not to move, the cylinder operates so that the upper knife moves downwards to cut the grid 110.

In Step (c), the cut grid 110 is stacked on the electrode tab 120, and the grid and the electrode tab are connected by means of laser welding. In the laser welding process, the laser welding may be performed in a state where the grid 110 is fixed with the jig 170. In a state where the grid is fixed with the jig 170 in Step (b), Step (c) may be performed. Also, after Step (b), the grid 110 may be separated from the jig 170 and then fixed with another jig 170. The laser welding process may be performed in a state where the grid 110 and the electrode tab 120 are pressed with a block so as to be closely adhered.

After that, the laser welding process is performed with a predetermined pattern, which is any one selected from the group consisting of a linear pattern, a zigzag pattern and a wave pattern. At this time, since dust may be generated during laser welding, an exhaust device may be installed separately. In addition, in order to minimize the generation of dust or sparks, an inert gas such as nitrogen or argon may be supplied to the laser welding portion.

The connecting method between a grid and an electrode tab of a secondary battery according to an embodiment of the present disclosure may further include a step of pre-welding the grid 110, before Step (a). If the grid is partially pre-welded to the electrode plates of the stacked positive and negative electrodes in advance, connection and strength between the electrode plate and the grid may be enhanced further. The pre-welding may be ultrasonic welding.

The connecting method between a grid and an electrode tab of a secondary battery according to an embodiment of the present disclosure may further include a step of stacking the electrode tab on the grid and aligning a location of the electrode tab, after Step (b).

EXAMPLES

Hereinafter, the present disclosure will be described in more detail based on examples. The examples set forth in this specification are just for better understanding of the present disclosure and not intended to limit the scope of the present disclosure.

Example 1

An electrode assembly having width of 215 mm, length of 220 mm and thickness of 6.5 mm was prepared, and after a grid was cut, the grid and the electrode tab were connected by means of laser welding to prepare a cell.

Example 2

An electrode assembly was prepared in the same way as Example 1. After pre-welding was performed thereto by means of ultrasonic welding, the grid was cut, and then the grid and the electrode tab were connected by means of laser welding to prepare a cell.

Comparative Example

An electrode assembly having width of 215 mm, length of 220 mm and thickness of 6.5 mm was prepared, and pre-welding was performed thereto by means of ultrasonic welding. Then, after a grid was cut, the grid and the electrode tab were aligned, and then a hole into which a rivet was to be inserted was formed therein. After that, a washer was supplied to the other end of the rivet, the corresponding rivet was inserted into the rivet hole, and roll-pressing was performed to prepare a cell.

Experimental Example 1

Figure 5:
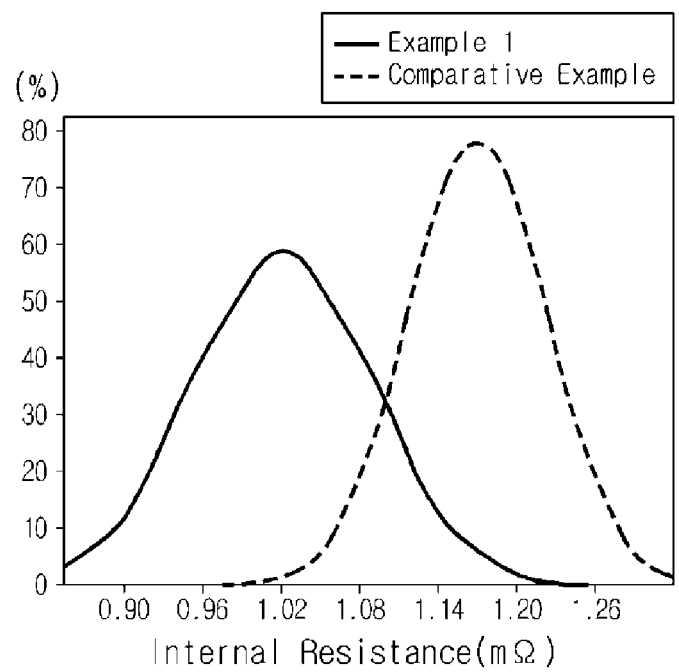
FIG. 5 is a diagram showing internal resistance of Example 1 and the Comparative Example.

500 cells were prepared according to Example 1 and the Comparative Example, respectively, and AC IR (internal resistance) was measured. FIG. 5 is a diagram showing internal resistance of Example 1 and the Comparative Example. A Y-axis of FIG. 5 represents a fraction of a corresponding cell among the prepared 500 cells, with respect to an X-axis. Referring to FIG. 5, the cell of Example 1 prepared by means of laser welding exhibited a mean internal resistance of 1.02 mΩ, but the cell of the Comparative Example exhibited a mean internal resistance of 1.16 mΩ. Thus, it may be found that the internal resistance of Example 1 is lower. Therefore, it may be understood that the cell of Example 1 prepared by means of laser welding has smaller heating.

Experimental Example 2

CP discharge evaluation was performed to the cells prepared according to Examples 1 and 2 and the Comparative Example.

Charging Condition

Charging was performed in a constant current and constant voltage (CC-CV) manner, and the cell was charged by applying a constant current of 17.5 A up to 4.2V, and if reaching to the voltage of 4.2V, the cell was charged with a constant voltage. If the current gradually decreases and reaches 1.72 A, the charging was terminated.

Discharging Condition

Discharging was performed in a constant power (CP) manner, and if the voltage reached 2.7V, the discharging was terminated.

The results of CP discharge evaluation on the cells according to Examples 1 and 2 and the Comparative Example are shown in Table 1 below.

TABLE 1

|  | Early internal resistance (mΩ) | Time (min) | Voltage before discharge (V) | Later internal resistance (mΩ) |
|---|---|---|---|---|
| Example 1 | 0.52 | 6.35 | 3.891 | 0.64 |
| Example 2 | 0.52 | 6.37 | 3.891 | 0.64 |
| Comparative Example | 0.66 | 6.37 | 3.847 | 0.76 |

In Table 1, the early internal resistance represents an internal resistance before the CP discharge evaluation, and the later internal resistance represents an internal resistance after the CP discharge evaluation. The time represents time taken for the discharge evaluation.

Figure 6:
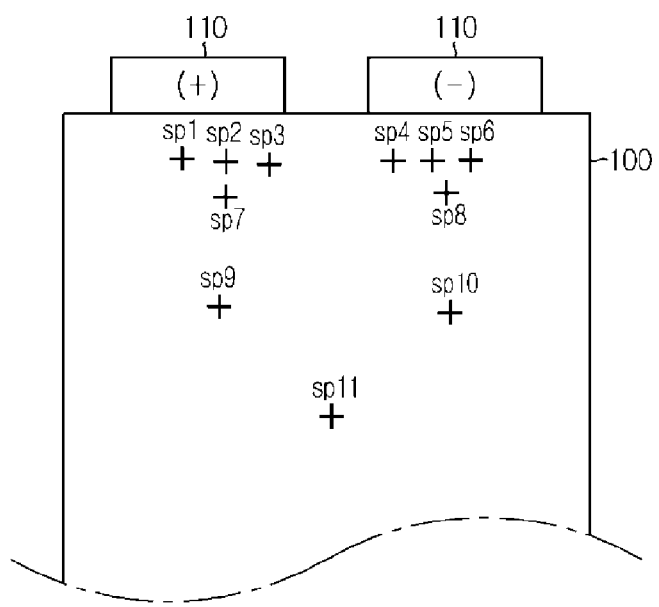
FIG. 6 is a schematic diagram showing a point where a cell temperature is measured according to Experimental Example 2.

After that, temperature behaviors of the cells according to Examples 1 and 2 and the Comparative Example were checked. FIG. 6 is a schematic diagram showing a point where a cell temperature is measured according to Experimental Example 2. Temperature of each point was measured according to FIG. 6. The measurement results are shown in Table 2 below.

TABLE 2

|  | Positive electrode tab | | | Negative electrode tab | | | Cell surface | | | | |
|---|---|---|---|---|---|---|---|---|---|---|---|
|  | SP1 | SP2 | SP3 | SP4 | SP5 | SP6 | SP7 | SP8 | SP9 | SP10 | SP11 |
| Example 1 | 70.1 | 70.1 | 69.7 | 59.9 | 58.7 | 58.4 | 73.4 | 67.1 | 73.3 | 71.0 | 72.2 |
| Example 2 | 68.6 | 69.3 | 68.9 | 61.5 | 60.4 | 60.2 | 72.2 | 67.3 | 72.3 | 70.6 | 72.2 |
| Comparative Example | 88.5 | 94.4 | 93.5 | 64.1 | 62.2 | 61.9 | 87.7 | 70.4 | 78.7 | 75.4 | 76.2 |

Seeing the temperatures of the cells according to Examples 1 and 2 and the Comparative Example as shown in Table 1, it may be found that the temperature of Examples 1 and 2 is lower than that of the Comparative Example, and this means that heating becomes smaller due to low resistance. Therefore, it may be understood that the cells of Examples 1 and 2 prepared by means of laser welding have lower resistance and thus are suitable for large capacity and high output.

The present disclosure has been described in detail. However, it should be understood that the detailed description and specific examples, while indicating embodiments of the disclosure, are given by way of illustration only, since various changes and modifications within the scope of the disclosure will become apparent to those skilled in the art from this detailed description.

REFERENCE SYMBOLS

100: electrode assembly
110: grid
120: electrode tab
130: laser welding portion
140: resin
150: rivet
160: protecting member
170: jig

What is claimed is:

1. A connecting method between a grid and an electrode tab of a secondary battery, comprising:
    (a) fixing the grid with a jig;
    (b) cutting the grid; and
    (c) stacking the grid and the electrode tab and connecting the grid and the electrode tab by means of laser welding,
    wherein the connecting method further comprises pre-welding the grid by means of ultrasonic welding before the step (a), and stacking the electrode tab on the grid and aligning a location of the electrode tab after the step (b),
    wherein in the step (c), the laser welding forms a laser welding portion at a region where the grid and the electrode tab are stacked,
    wherein the laser welding portion is formed to have a predetermined pattern repeatedly,
    wherein the predetermined pattern is a vertically uneven wave form that has laterally linear welding portions and laterally linear non-welding portions respectively formed along lateral linear lines of an upper portion and a lower portion thereof, the welding portions at the upper portion of the pattern and the welding portions at the lower portion of the pattern are connected to each other by means of laser welding at different locations along a lateral direction so as to be connected with a linear slope from the linear line of the upper portion to the linear line of the lower portion and connected with a linear slope from the linear line of the lower portion to the linear line of the upper portion, and the laser welding portion of the predetermined pattern is continuously formed in one direction from a front point to a last point thereof,
    wherein one end and the other end of the predetermined pattern are separated from each other, and
    wherein the predetermined pattern is formed in a lateral parallel to a virtual horizontal line.

* * * * *